United States Patent [19]

Batterman et al.

[11] Patent Number: 5,378,883
[45] Date of Patent: Jan. 3, 1995

[54] OMNIDIRECTIONAL WIDE RANGE HAND HELD BAR CODE READER

[75] Inventors: Eric P. Batterman, Flemington; Donald G. Chandler, Princeton, both of N.J.

[73] Assignee: Omniplanar Inc., N.J.

[21] Appl. No.: 736,920

[22] Filed: Jul. 19, 1991

[51] Int. Cl.$^6$ ............................................... G06K 7/10
[52] U.S. Cl. ...................................... 235/472; 235/455; 235/462
[58] Field of Search ............... 235/455, 462, 472, 467; 250/566

[56] References Cited

U.S. PATENT DOCUMENTS

| | | | |
|---|---|---|---|
| 3,868,634 | 2/1975 | Dolch | 235/471 |
| 4,180,204 | 12/1979 | Koenig et al. | |
| 4,282,425 | 8/1981 | Chadima, Jr. et al. | |
| 4,488,679 | 12/1984 | Bockholt et al. | |
| 4,500,776 | 2/1985 | Laser | |
| 4,570,057 | 2/1986 | Chadlma, Jr. et al. | |
| 4,766,300 | 8/1988 | Chadima, Jr. et al. | |
| 4,776,464 | 10/1988 | Miller et al | 235/471 |
| 4,877,949 | 10/1989 | Danielson et al. | |
| 5,019,699 | 5/1991 | Koenck | |
| 5,059,779 | 10/1991 | Krichever et al. | 235/472 |
| 5,146,463 | 9/1992 | Rando | 250/566 |

FOREIGN PATENT DOCUMENTS 0221545 5/1987 European Pat. Off.
0367300 5/1990 European Pat. Off.

Primary Examiner—Harold Pitts
Attorney, Agent, or Firm—Allan Jacobson

[57] ABSTRACT

A hand-held bar code reader with a two dimensional image sensor for omnidirectional bar code reading, includes variable imaging optics, and flash illumination with variable flash illumination optics. A spotter beam is provided for aiming the hand held bar code reader at a bar code symbol. The spotter beam is also used to measure the range to said bar code from said hand held bar code reader and to determine the focal length of said variable imaging optics and variable flash illumination optics. The imaging optics are adjusted automatically to provide the correct magnification and focus of a bar code regardless of range to the label. The variable focal length flash illumination optics are used to concentrate illumination energy only in the field of view of the bar code reader. The flash illumination energy is conserved by measuring the ambient light and setting the level of flash illumination energy in accordance with the measured level of ambient light. In such manner, conventional, damaged, multiple, and stacked bar codes symbols along with true two dimensional codes may be rapidly read over distances from under one foot to over several feet without having to align the bar code reader to the bar code.

48 Claims, 5 Drawing Sheets

OMNIDIRECTIONAL WIDE RANGE HAND HELD BAR CODE READER

FIELD OF THE INVENTION

The invention relates to an improved method and apparatus for reading bar codes omnidirectionally over a wide range of distances.

BACKGROUND OF THE INVENTION

Various types of hand-held bar code readers such as wands, fixed beam, moving beam, and linear CCD readers, have been developed for many applications. Such examples of prior art hand held bar code readers are not omnidirectional, and therefore suffer from serious drawbacks including limited range, the need to align the reader scan line with the bar code (i.e. lack omnidirectionality), inability to read damaged, poorly printed, multiple, stacked or true two dimensional codes.

Wands, fixed beam, and moving beam readers all operate using the same basic principle. Typically, a small spot of light is directed from a source of illumination to the surface of the bar code and is swept across the entire length of the bar code (i.e. a scan line). The intensity of the reflected light from the beam is modulated by the bar code pattern. This reflected light is gathered by optics and focused on an optical detector which converts light intensity to an electrical signal. Since light areas reflect more than dark areas, the reflected light intensity represents the digital code which serves to identify the content of the bar code symbol.

The wand is the least complicated of these readers and consists of a light source (typically an LED) and a photosensitive element in a pen-like package. The operator must sweep the wand across the length of the bar code while keeping the tip of the wand in contact with the bar code. This severely restricts the use of wands to applications where the operator can physically contact the bar code. Additionally, repeated sweeps of the bar code are typically necessary to obtain a valid read, increasing the overall time required to read each bar code. Wands will not read damaged or poorly printed bar codes.

A fixed beam reader operates with the same basic principles as the wand without the need to maintain physical contact with the bar code. The spot, typically produced by an LED or laser, is projected from the reader to distances up to about one foot. The operator is required to sweep the projected spot across the bar code. Fixed beam readers require very careful and accurate aim. Additionally, hand motions or jitter is amplified as the distance to the bar code increases. The longer the range, the larger the bar codes must be. Fixed beam readers will not read damaged or poorly printed bar codes.

Moving beam readers direct an LED or laser beam in a repetitive linear (i.e. one-dimensional) scanning pattern using rotating or vibrating mirrors and lenses. These readers eliminate the need for manual scanning or sweeping of the code. A moving beam reader typically scans at about 40 scans per second, allowing multiple tries on a bar code. This provides a better chance to get a valid read on a bar code with minimal damage. However the readers must get a complete valid scan (i.e. cut through all of the bars in one sweep) in order to decode a bar code. Moving beam readers are also restricted to reading small codes up close and large codes far away. Typical range of moving beam readers is about one foot. Moving beam readers will not read damaged or poorly printed bar codes.

Linear CCD readers eliminate the need for mechanically sweeping a beam across bar codes, but require a bright source of illumination. Linear CCD readers capture a one dimensional image of the bar code and read out the information as an electrical signal which is similar to the output of wand, fixed, or moving beam readers. Linear CCD readers have an extremely small depth of field of about one inch, and are usually limited to reading bar codes shorter than the width of the CCD reader head (typically less than 3 inches). Linear CCD readers will not read damaged or poorly printed bar codes.

CCD readers typically use light emitting diodes (LED) for illumination. Attempts have been made to improve the performance of linear CCD readers by using flash illumination. Examples of such readers are shown in U.S. Pat. Nos. 4,282,425; 4,766,300; and 4,570,057. However, the readers disclosed in these patents still have a very limited operating range of about one inch and therefore require a proximity sensor to detect when the reader is within the operating range to prevent wasting flash energy. Additionally, the flash illuminates an area much larger than necessary, and provides no assistance with aiming the reader. The actual area that is imaged by the linear CCD sensor, and therefore the only area requiring illumination, is a typically under one tenth of a millimeter tall by two or three inches wide. It is extremely difficult to concentrate illumination energy on such a short area due to the diameter of the flash tube and the compromises required in the reflector design to accommodate the depth of field. Therefore, the flash illumination described wastes most of the illumination energy.

U.S. Pat. No. 4,877,949 discloses automated focus based on distance measurement to improve the reading range of hand held linear CCD readers. However, this reader only increased the range from the one inch of fixed optics linear CCD readers to three inches, and can still only read relatively short bar codes. The reader described must compromise the fixed flash illumination system even more to accommodate this small increase in range, thereby decreasing illumination efficiency. Two marker light beams are required to delineate the image sensor field of view. The operator must therefore align the reader scan line with the bar code by placing the marker spots at both ends of the code, which in many cases necessitates severe twisting of the arm and wrist.

Many situations require reading of multiple codes on a single label such as the Automotive Independent Action Group (AIAG) Specification B-3. Existing hand held readers must be individually aimed and triggered at each individual bar code. Additionally, stacked bar codes such as Code 49 and 16K are very time consuming and difficult to read with existing hand held bar code readers. True two dimensional codes (codes that do not encode information in a linear fashion only) such as Vericode, Datacode, and United Parcel Service UPSCODE, can not be read with these readers.

In general, in the prior art, it is typically necessary for the operator to either orient the bar code, or otherwise position the bar code and/or the reader scan line manually in order to achieve proper operation. Prior art bar code readers have severe maximum range limitations. Within this limited range prior art bar code readers are restricted to reading large codes far away, and small codes up close. Also, prior art bar code readers have difficulty reading damaged, stacked, and multiple bar codes. Prior art bar code readers can not read true two dimensional codes. Furthermore, attempts to increase the range of prior art non-omnidirectional bar code readers results in a difficult, and in many common situations, impractical devices to use. As range increases, the aiming accuracy and steadiness required with non-omnidirectional readers makes it very difficult to read bar codes that do not have a high aspect ratio (ratio of height of the bars to overall bar code length). It therefore becomes virtually impossible to align the reader scan with short and or stacked codes at distance. Multiple and stacked codes become nearly impossible to read at distance. The common result of these limitations is misread bar codes, unread bar codes, and/or excessive amounts of time to get in range and align the reader scan line with the bar code. Due to the limitations of the prior art bar code readers, the benefit of marking items with machine readable symbols is greatly reduced or lost.

SUMMARY OF THE INVENTION

The present invention is embodied in a hand-held reader in which bar codes are rapidly and reliably read omnidirectionally over a wide range of distances. Furthermore, a bar code reader in accordance with the present invention provides for omnidirectional reading of conventional, damaged, multiple, and stacked bar codes symbols along with true two dimensional codes. Omnidirectionality permits the operator to hold the gun at any arbitrary orientation and successfully read a bar code.

A hand held bar code reader in accordance with the present invention includes imaging optics and a two dimensional image sensor for capturing a two dimensional image which includes the image of a bar code, and image processing means for omnidirectionally reading the bar code image. By reading the bar image omnidirectionally, the operator does not have to carefully align the reader and the bar code so that reading a bar code from a distance of several feet or more becomes practical. Even at close range, bar code reading is easier and faster as compared to prior art hand held readers.

In accordance with another aspect of the present invention, a hand held bar code reader includes flash illumination with focused optics for concentrating illumination energy only in the field of view of the bar code reader. In such a manner, a focused flash conserves energy and aids in pointing the hand held reader.

In accordance with another aspect of the present invention, a hand held bar code reader includes variable focus and focal length (variable magnification, also known as zoom) imaging optics. A spotter beam is used for aiming the hand held bar code reader and is used with the two dimensional image sensor to measure the range to the label and to determine the focal length of the variable imaging optics. In such manner variable optics are adjusted automatically to provide the correct magnification and focus of a bar code regardless of range to the label.

In accordance with yet another aspect of the present invention, a hand held bar code reader includes variable focal length flash illumination optics. The focal length of the flash illumination optics are automatically adjusted to concentrate the illumination energy only in the field of view of the bar code reader (the field of view varies with the imaging optics). In such a manner, a focused flash with variable focal length conserves energy and aids in pointing the hand held reader.

In accordance with yet another aspect of the present invention, a hand held bar code reader includes means for measuring the ambient light conditions and setting the flash energy accordingly.

DETAILED DESCRIPTION

Figures 1A, 1B:
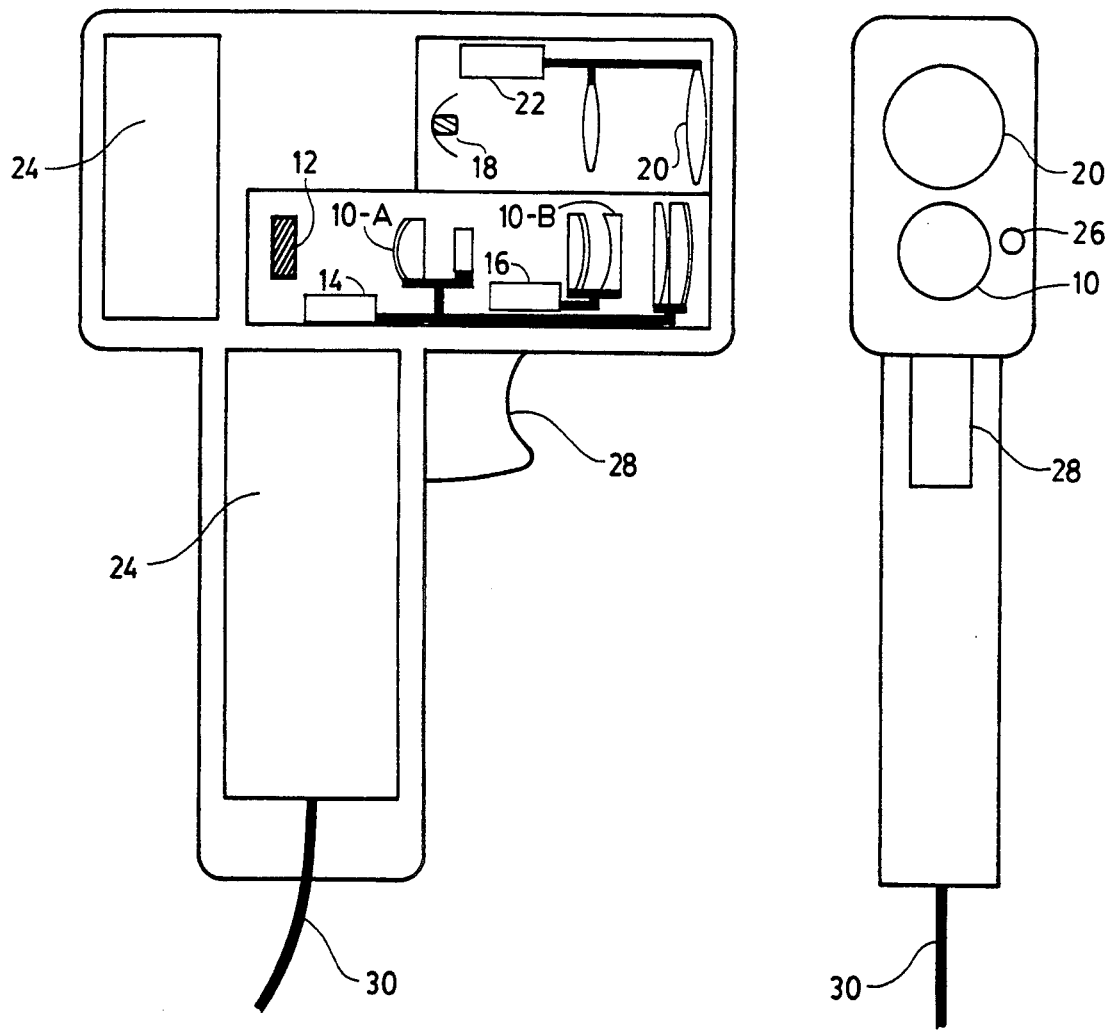
FIG. 1A is a diagrammatic side view illustrating a bar code reader in accordance with the present invention.
FIG. 1B is a diagrammatic front view illustrating a bar code reader in accordance with the present invention.

A schematic assembly diagram of a bar code reader in accordance with the present invention is shown in FIG. 1A and 1B. Imaging optics 10-A with variable focus and 10-B with variable focal length are coupled to an image sensor 12. The focus and focal length are set by optics actuators 14 and 16. Illumination is provided by a xenon flash 18 with variable energy. Flash optics 20 are used to provide an illuminated area approximately the same size as the imaged area. The flash optics are also variable and are set by optics actuator 22. Bar code location, decoding, and overall reader control is provided by control and processing electronics 24. Spotter beam 26 provides a targeting spot for reader aiming, and is used to measure distance from the reader. Trigger 28 activates the reading process. The decoded bar code information is output to an external device by the I/O port 30.

Figure 2:
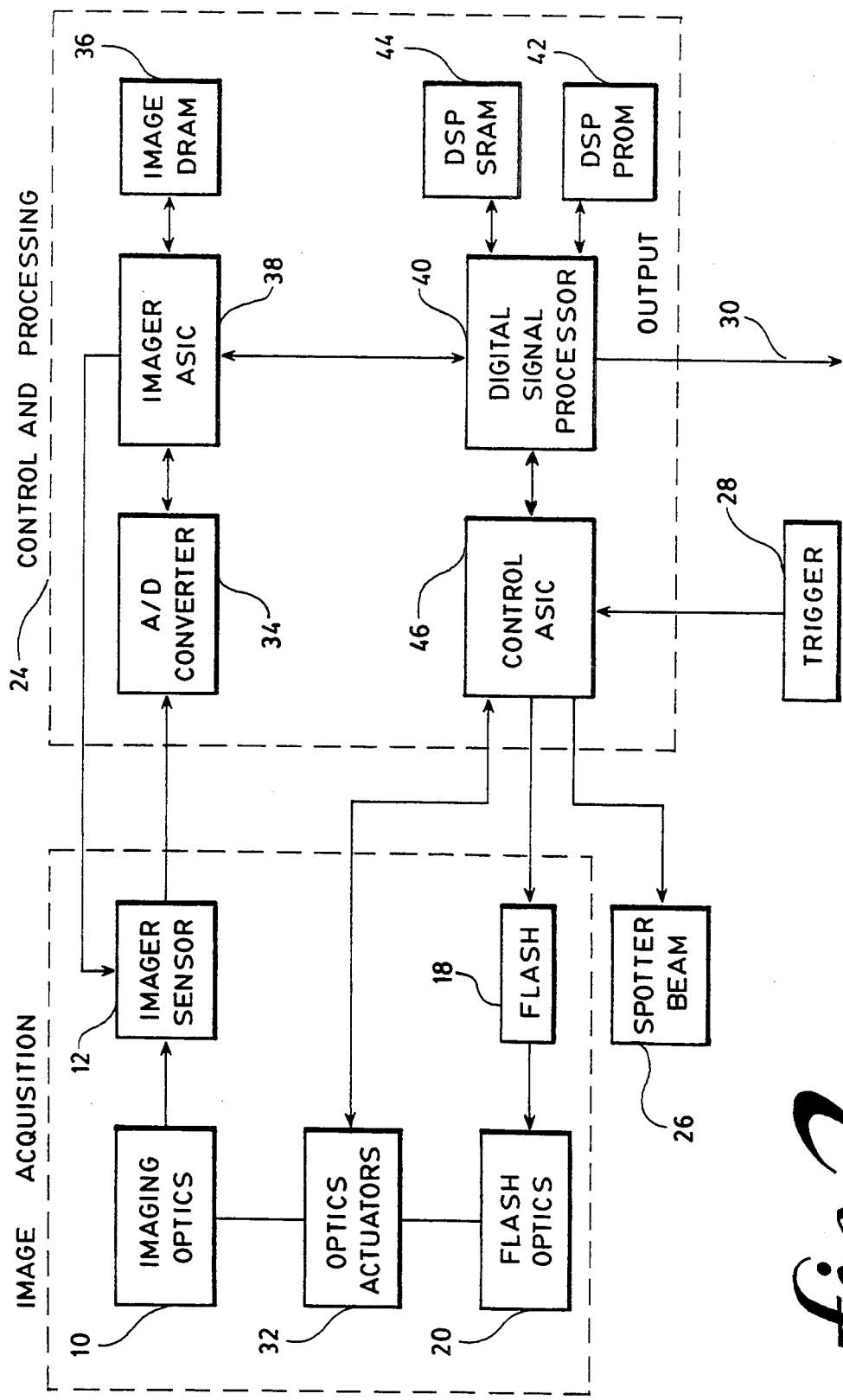
FIG. 2 is a block diagram of a system for a bar code reader in accordance with the present invention.

A block diagram of the bar code reader is shown in FIG. 2. Imaging optics 10 with variable focus and focal length are coupled to an image sensor 12. The focus and focal length are set by optics actuators 32 (comprised of actuators 14, 16 and 22 shown in FIG. 1A). Illumination is provided by a flash 18 with variable light intensity. The flash 18 is typically a xenon tube. Flash optics 20 are used to provide an illuminated area approximately the same size as the imaged area. The flash optics are also variable and are set by optics actuator 22.

The output of image sensor 12 is converted from analog to digital in A/D converter 34, and stored in a first memory 36. The first memory is preferably a dynamic random access memory (DRAM). A first controller, imager ASIC 38, which may be an application specific integrated circuit (ASIC) controls the image sensor 12 and the image DRAM 36. This ASIC performs this and other tasks under the control of a digital signal processor 40. Digital signal processor 40 is typically a high speed microprocessor such as the ADSP-2101 available from Analog Devices, Norwood, Mass. The memory space for digital signal processor 40 is both ROM 42 for program storage, and static random access memory 44 (SRAM) for image processing storage/scratch pad. The output of the reader 30 is decoded bar code information.

The spotter beam 26 provides a beam of light used by the operator to aim the reader at a candidate bar code and provides a means for determining distance to bar code. The spotter beam 26 is comprised of a light source, typically a visible laser diode (VLD) and a fixed lens.

Figure 3:
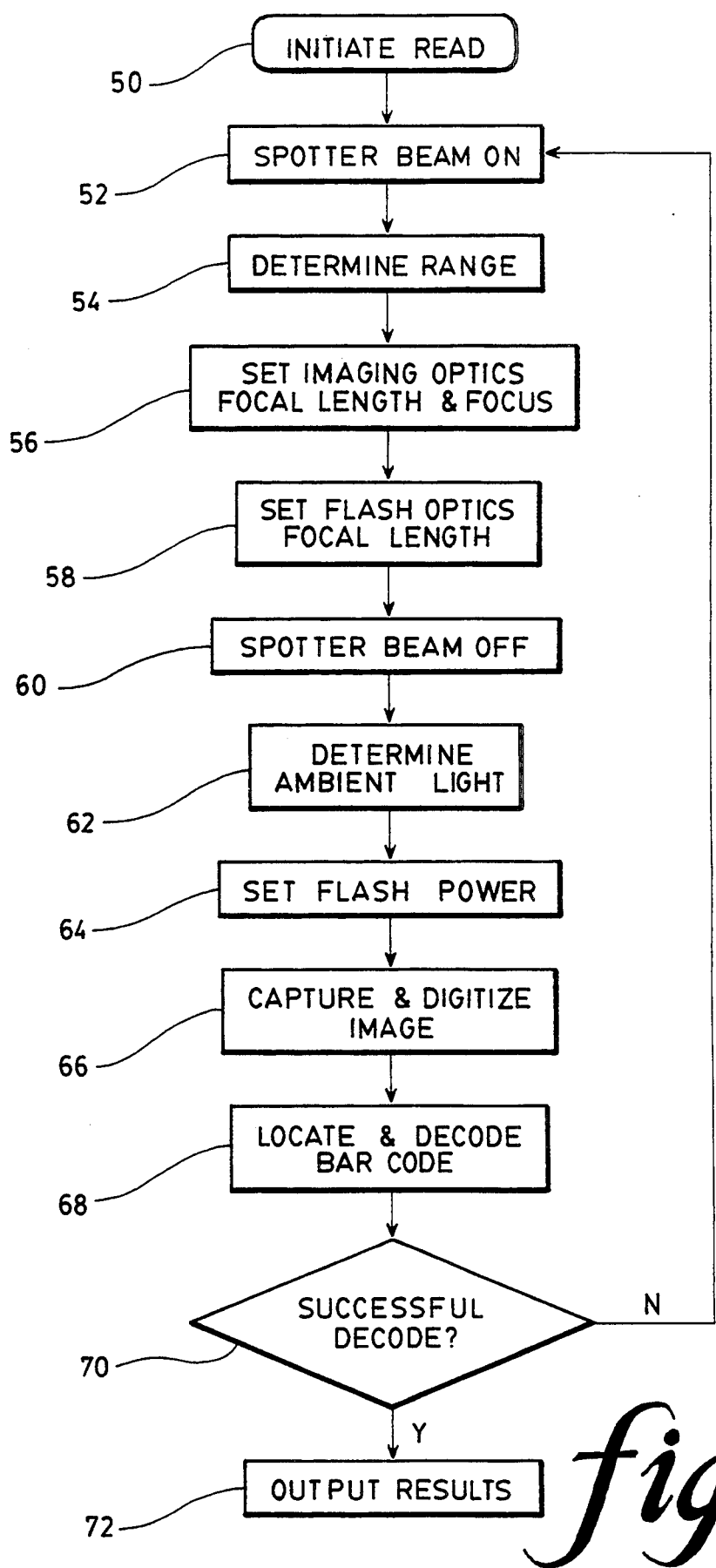
FIG. 3 is a flow chart illustrating the operation of the bar code reader in accordance with the present invention.

A second controller ASIC 46, is also under the control of DSP 40 and provides a means to control the electro-mechanical components of the reader. Controlled parameters include controlling the position of the optics actuators 32, the intensity and activation of the flash 18 as well as turning the spotter beam 26 on and off. FIG. 3 shows a flow chart of the overall operation of the hand held bar code reader.

In operation, a bar code read is initiated by trigger 28 which via control ASIC 46, provides an input signal to DSP 40, shown as step 50 in FIG. 3. Responsive to the control outputs of DSP 40, control ASIC 46 turns on the spotter beam 26 at step 52 allowing the user to aim the reader at the label desired.

The distance from the reader to the label must be measured to allow the correct setting of the imaging optics 10, and the flash optics 20. The reader determines the distance at step 54 by capturing an image of the spotter beam, and then calculating the distance to the bar code by the position of the image of the beam on the image sensor. The reader also determines the focal length setting of the imaging lens in the same manner, eliminating the need for separate systems to determine distance (such as ultrasonic, or dedicated electro-optical components) and lens focal length position encoding.

After the distance is determined, the imaging and flash optics are set at steps 56 and 58. The reader may turn off the spotter beam at step 60 and then capture an image before turning on the flash illumination in order to determine the ambient light on the label, step 62. The amount of ambient light and the area required to be illuminated allows the proper setting of flash energy at step 64.

After the reader is aimed at the label, and the optics and flash energy are set, the system captures an image at step 66. This step may be performed under operator control by pulling the trigger again, or using a two position trigger. Alternatively, the initiation of image capture step could be performed automatically by having the reader wait a predetermined time after the spotter beam is turned on, or by detecting a lack of movement of the spotter beam.

The image sensor 12 is electronically cleared and the flash 18 fires. The image captured on the image sensor 12 is read out and digitized by A/D converter 34 and stored in image DRAM 36. A shutter may be necessary in readers that are used in bright ambient light to prevent the ambient light from corrupting the image during read out (typical image sensors are always integrating).

The reader now has a digitized image of its field of view, which may contain a bar code label, stored in image DRAM 36. The DSP 40, in conjunction with imager ASIC 38, performs stored programs to locate and decode the bar code at step 68. The process of locating and decoding a bar code stored in a digital image memory is described in great detail in the pending patent applications entitled "IMPROVED METHOD AND APPARATUS FOR A HIGH SPEED OMNIDIRECTIONAL BAR CODE READER", serial No: 500802, filed: Mar. 28, 1990, "DUAL PROCESSOR OMNIDIRECTIONAL BAR CODE READER WITH DUAL MEMORY FOR BAR CODE LOCATION AND ORIENTATION", Ser. No: 502411, filed Mar. 28, 1990, and "OMNIDIRECTIONAL BAR CODE READER WITH METHOD AND APPARATUS FOR DETECTING AND SCANNING A BAR CODE SYMBOL", Ser. No: 501259, filed Mar. 28, 1990. The decoded bar code information is output to an external device by I/O port 30 at step 72. Additionally, the I/O port 30 can be used to supply power to the hand held reader.

The reader utilizes two processors to effectively locate and read bar code labels at low cost. The imager ASIC/processor 38, which operates under the control of the DSP 40, has specialized high speed algorithms to search the entire image for the bar code. The DSP 40 performs more detailed processing/decoding on the areas identified by the imager ASIC 38 as likely to contain a bar code.

If no bar code was located/decoded, step 70, the reader may repeat the entire process as long as the trigger is still activated.

Bar codes are commonly used in many different lengths depending on the number of characters of information required. The length typically ranges from 2 to 30 characters. Bar codes should be sampled at a density of approximately 1.65 pixels for each narrow bar (commonly referred to as the x-bar or module) to provide an adequate resolution. It is therefore necessary to use a high resolution imager to read the longer bar codes.

A suitable image sensor for use with the present invention is the MOS image sensor array 98268 available from Hitachi Corporation. This sensor has 768 pixels in the horizontal direction and 576 pixels in the vertical direction. The pixels are 11 microns square. At the preferred sample density of 1.65 pixels per module, a reader incorporating the 98268 imager will be able to read bar codes that are approximately 31 characters long horizontally (768 pixels)/(1.65 pixels/module)/(15 modules/character), and 23 characters vertically of Code 39.

The focal length of the imaging optics must be set to provide the correct magnification for the desired sample density. The focal length is a function of the module size of the bar code, the size of the imager, the distance from the reader to the bar code, and the sample density. The preferred embodiment of the reader uses an imaging lens that has a focal length that ranges from approximately 12 to 75 mm. This provides a wide range of coverage for various module size bar codes at distances ranging from about 1 to 8 feet.

The maximum range of the reader is a function of the focal length and module size. Range increases as focal length and/or module size increases. For example, the maximum range of the preferred embodiment for a bar code with a module size of 10 mils is approximately 54 inches at the maximum focal length setting. If the bar code had a module size of 20 mils, the range doubles to approximately 108 inches at the maximum focal length setting.

It is desirable to maintain the same number of pixels per module, regardless of the size of the module and the distance away, though this is not possible in all circumstances. One instance is reading a bar code with a very large module size up close. Since it is not practical to have lenses with a focal length short enough (wide enough angle) to capture the bar code at 1.65 pixels per module at close range, this situation can be handled by down sampling the image. For example, the preferred embodiment's lens shortest focal length is 12 mm. Therefore the closest range at which a bar code with a module size of 40 mils can be sampled at 1.65 pixels/module is approximately 46 inches. If this bar code was only 23 inches away, the image would be captured at a sample density of 3.3 samples/module. The image must then be down-sampled by a factor of two in each direction (X and Y). In the this simple example, every other pixel vertically, and horizontally could be discarded. Down-sampling can also be performed in non-integer fashion by interpolation. The process of interpolation is well known to those skilled in the art of digital signal processing, and is described by Peled and Liu in "DIGITAL SIGNAL PROCESSING theory, design, and implementation", published in 1976 by John Wiley and Sons. The ability to automatically control focal length and/or down-sampling overcomes the longstanding weaknesses of prior art bar code readers: short range, small depth of fields, and the restriction of reading small module size bar codes up close and large module bar codes far away.

The reader may have three basic modes of operation for determining the correct setting of magnification. The first mode (or "known" mode) is when the module size of the bar code to be read is known before the whole reading process begins. This knowledge could be entered into the reader via the I/O port 30, or other means.

In the known mode, the only additional information required to set the focal length for each read is the distance to the bar code. In operation, the reader is aimed at the code, the distance is measured, and the focal length required is easily computed by the DSP. The focal length is set to provide a sample density of 1.65 pixels/module and the reader captures and processes the bar code. If the bar code is too close for the preferred sample density of 1.65 samples/module, the focal length is set to the minimum, and the down-sampling required is easily computed as a function of distance and module size.

The second mode (or "unknown mode") is when the module size of the bar code to be read is unknown before the whole reading processes begins. In unknown mode, an image of the bar code is captured at the maximum focal length, the image is processed to determine the module size, and if necessary, the optics are reset to recapture and reprocess the bar code at the desired sample density.

Since the module size is unknown, maximum focal length is initially set to guarantee adequate resolution of the bar code in the chance that module size is small. There are a variety ways to process the image of the bar code to determine the module size. The preferred embodiment determines the module size by performing the locating process described in the pending patent application "OMNIDIRECTIONAL BAR CODE READER WITH METHOD AND APPARATUS FOR DETECTING AND SCANNING A BAR CODE SYMBOL", Ser. No: 5012159, filed Mar. 28, 1990 on the image at various degrees of down-sampling.

If the module size, and therefore sample density was determined to be correct on the first image capture, the reader continues on to process and decode the bar code without resetting the optics. In the situation where the sample density was incorrect (too high for example), but the entire bar code was in the field of view, the reader can also continue on to process and decode the bar code in a down-sampled fashion. In the situation where the sample density was incorrect (too high), but the entire bar code was not completely in the field of view, the focal length must be reduced to provide the correct sample density and allow the recapture of the entire image of the bar code.

A third operating mode, memory mode, is a combination of known and unknown mode. In memory mode, when the reader first reads, it temporarily operates in unknown node to determine the module size of the bar code. The reader stores the module size and on the second and all subsequent reads, it operates in known mode, using the stored module size. If, during memory mode, the reader fails to read using the stored module size, it may return to unknown mode to update the module size required.

Figure 4:
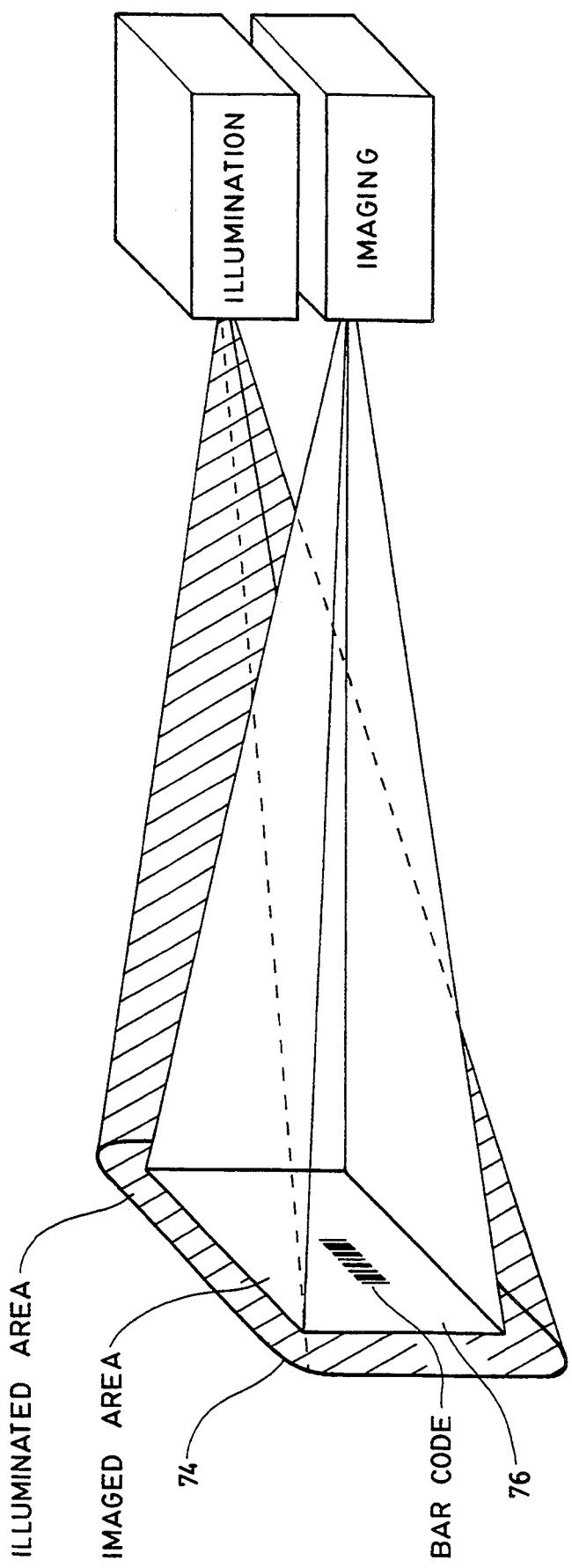
FIG. 4 is a representation of the respective two dimensional areas illuminated and imaged by the bar code reader in accordance with the present invention.

The illumination source for the preferred embodiment may be a xenon flash tube, a reflector, and variable focal length optics. The focal length of the flash optics tracks the focal length of the imaging optics to provide an illuminated area 74 approximately the same size as the imaged area 76 as shown in FIG. 4. The exact focus of the flash optics is not critical since the goal of the illumination is to project light energy, not an image. The only requirement is that the illuminated area must be equal to or greater than the imaged area. The axis of the illumination optics may need adjustment up or down in the vertical plane (in a reader where the illumination axis is above the imaging axis) as a function of distance to ensure illumination of the entire image area at all ranges. This parallax correction could be coupled to the imaging optics focusing actuator, since the focus is a function of distance. However, in the preferred embodiment, the need for a mechanical parallax correction is eliminated by providing a slightly larger illuminated area.

As the imaged area size increases, the amount of flash energy required to illuminate the area also increases. The energy of the flash may be controlled to provide near constant illumination energy for the various range and focal length setting of the reader and to compensate for ambient light conditions. If the reader is used in bright ambient conditions, for example, the energy of the flash would be adjusted so that the combination of the ambient light and the flash provides the correct energy density. Additional benefits of a variable focal length and energy flash include the reduction of the energy to operate the reader (the flash consumes a large portion) by not wasting excess flash energy, reduced distraction to nearby personnel due to the restricted illuminated area, and compensation for the reader's lack of a variable aperture. Since the focused flash provides an illuminated area 74 approximately the same size as the imaged area 76 the flash may be used as an alternative method for aiming the reader, eliminating the need for a separate aiming device (i.e. spotter beam) in certain applications.

The control of flash energy is well known in the field of photography. The maximum amount of illumination energy required determines the actual type and size of xenon tube required. Any reduction of energy from the maximum is typically accomplished by setting the length of the flash pulse.

The distance from the reader to the label must be measured to allow the correct setting of the imaging optics 10, and the flash optics 20. The reader determines the distance by capturing an image of the spotter beam, and then calculating the distance to the bar code by the position of the image of the beam on the image sensor. The reader also determines the focal length setting of the imaging lens in the same manner. This eliminates the need for separate systems to determine distance (such as ultrasonic, or dedicated electro-optical components) and lens focal length position encoding.

Figure 5:
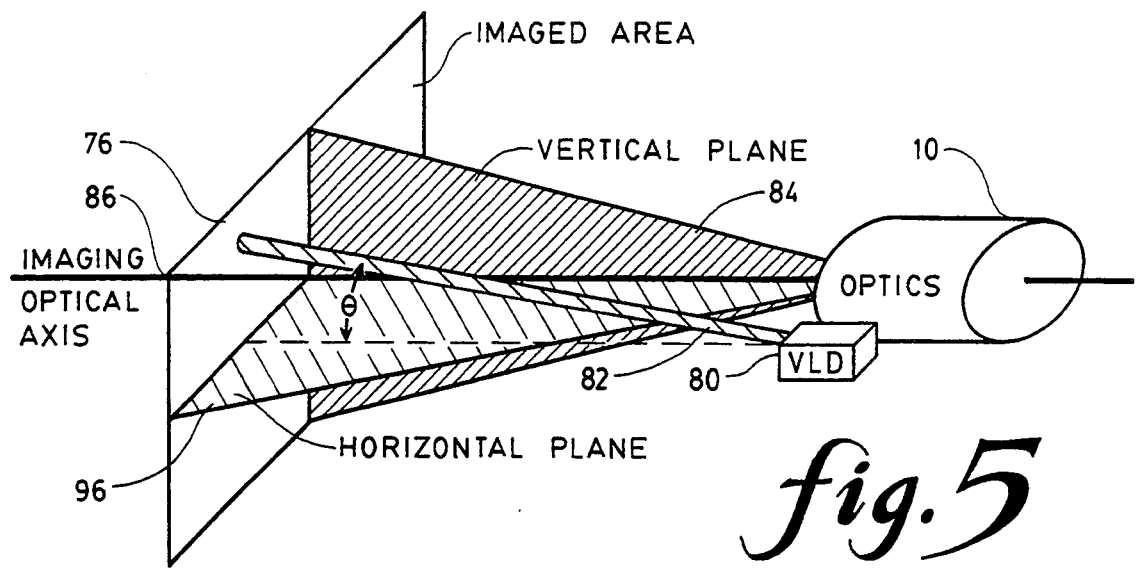
FIG. 5 is a three dimensional illustration of the placement of the spotter beam with respect to the imaging optics in accordance with the present invention.
Figure 6A:
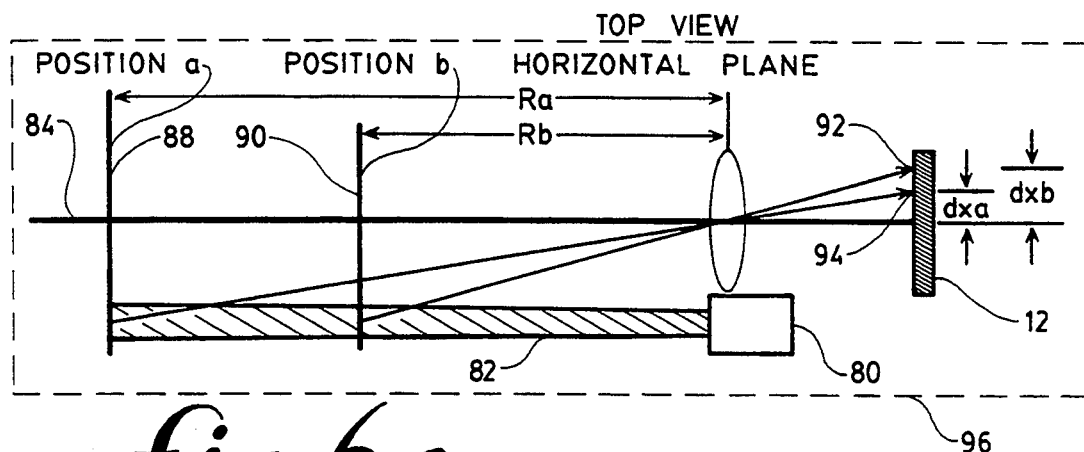
FIG. 6A illustrates the horizontal displacement of the spotter beam with respect to the vertical plane of the imaging optics in accordance with the present invention.

The preferred embodiment uses a visible laser diode (VLD) 80 to provide the spotter beam as shown in FIGS. 5 and 6. The VLD 80 is positioned in a manner that provides a beam 82 that is parallel to vertical plane 84 intersecting the axis 86 of the imaging optics. The horizontal position of an image of the spotter beam 82 on the image sensor 12 is proportional to the distance from the reader to the target. As the distance becomes greater, the spotter beam image moves closer to the center of the image sensor The distance is calculated from the geometry of similar triangles. In FIG. 6A, the label 90 (position b) with a range Rb produces an image of the spotter beam 82 at displacement dxb 92. Label 88 at a greater distance Ra (position a) produces an image of the spotter beam closer to the center of the image sensor, displacement dxa 94.

Figure 6B:
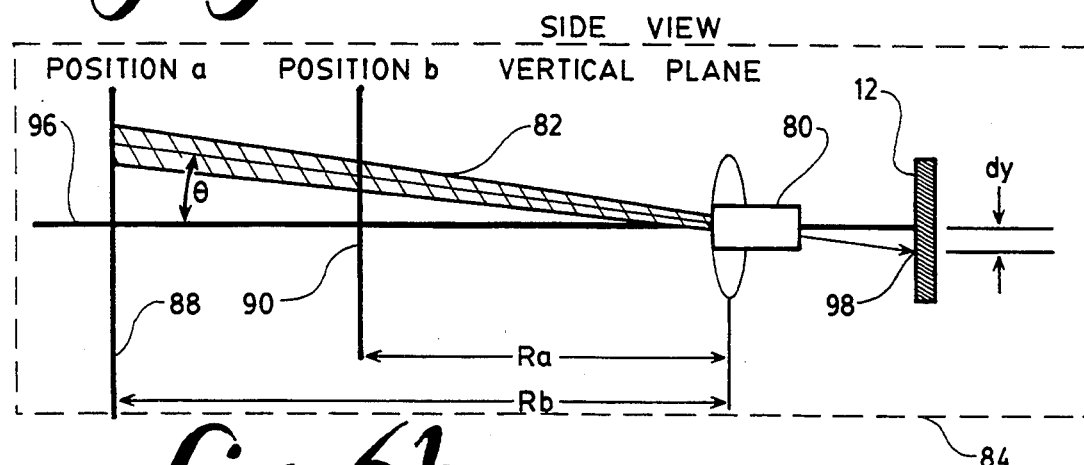
FIG. 6B illustrates the vertical angular displacement of the spotter beam with respect to the horizontal plane of the imaging optics in accordance with the present invention.

In order to determine exact distance, the focal length must be known. The preferred embodiment also uses the spotter beam 82 to determine focal length. In addition to being parallel to vertical plane 84 which intersects the axis of the imaging optics, the VLD 80 is positioned to project spotter beam 82 at an angle theta up from the horizontal plane 96 as shown in FIG. 5 and 6B. The vertical position of the spotter beam image on the image sensor 12 is therefore proportional to the focal length of the imaging optics, regardless of distance. As shown in FIG. 6B the angle theta of the spotter beam 82 is independent of the label distance. The angle theta, for a given focal length is the same for label 90 at distance Ra (position a), and label 88 at distance Rb (position b). The angle, and therefore focal length is measured by the vertical displacement 98 (dy) on image sensor 12.

The focusing and focal length determination process is repeated in an iterative fashion to obtain the most accurate results. When the trigger 28 is first activated, the optics may be in a predetermined rest position, or alternatively where the last read left them, depending on the design of the reader and type of actuators used. The first image of the spotter beam 82 may therefore be relatively unfocused. The reader determines a coarse range and focal length with this first image, and uses this information to reset the optics. As the optics are moving to their new settings, new range and focal length determinations are continuously made. Each new determination is then used to fine tune the optics setting. If, after an initial determination of the distance is made, the focal length is incorrect for a given module size and distance (as in memory mode), the reader adjusts the focal length, and then repeats the focusing procedure. There are a wide variety of actuators that can be used for the optics.

Since multiple images of the spotter beam are normally required for focal length setting and focus, it is desirable to capture and digitize only a subset of the total image likely to contain the spotter beam image. The chosen Hitachi 98268 image sensor along with the correct image sensor drive control using processor 40 and ASIC 38 allows readout of only a small portion of the entire sensor 12. Since readout time of the entire imager is approximately 30 msecs, readout of only the area of interest saves time and energy. It is also desirable to pulse the VLD 80 to save energy and to meet safety standards while projecting the brightest spot possible.

While it is appreciated that there are many ways to determine range to an object, the present invention determines both range and focal length without adding any additional components. Additionally, the reader may be calibrated during manufacture by positioning targets with known module sizes at known distances from the reader. The reader may then iteratively set its optics, capture and process the image of the targets until the correct focal length (sample density), and best focus are achieved. The horizontal and vertical displacements of the image of the spotter beam for various combinations of module size and distance during calibration may then be stored in nonvolatile memory and used to determine the correct optics setting for any situation.

What is claimed is:

1. In a hand held bar code reader having a two dimensional image capture means with a field of view defining an imaged area, said imaged area containing a bar code, a method of operation comprising:
    providing a flash of illumination forming an illuminated area, wherein said illuminated area is substantially coincident with and substantially equal to said imaged area over a substantial portion of the operating range of said hand held bar code reader;
    capturing a two dimensional image of said imaged area; and
    processing said captured two dimensional image in an omnidirectional manner to read out information contained in said bar code.

2. A method in accordance with claim 1, wherein said bar code in said imaged area is a two dimensional symbology.

3. A method in accordance with claim 1, further comprising:
    measuring the level of ambient light; and
    setting said flash of illumination energy level in accordance with said measured level of ambient light.

4. A method in accordance with claim 1, wherein said hand held bar code reader includes variable flash illumination optics, said method further comprising:
    setting the focal length of said variable flash illumination optics.

5. A method in accordance with claim 1 wherein said hand held bar code reader includes variable imaging optics, said method further comprising:
    setting the focal length of said variable imaging optics of said hand held bar code reader to provide magnification of said bar code image at a predetermined level.

6. A method in accordance with claim 5, further comprising:
    setting the focus of said variable imaging optics.

7. A method in accordance with claim 5, wherein said focal length setting to provide said predetermined level of said magnification of said bar code at a given distance from said bar code reader is a constant.

8. A method in accordance with claim 5, wherein said focal length setting to provide said predetermined level of said magnification of said bar code at a given distance from said bar code reader is a determined from said two dimensional image containing the image of said bar code.

9. A method in accordance with claim 6 wherein said hand held bar code reader includes variable imaging optics, said method further comprising:
measuring the focal length of said variable imaging optics.

10. A method in accordance with claim 9, further comprising:
measuring the range to said bar code from said hand held bar code reader.

11. A method in accordance with claim 10, further comprising:
providing a spotter beam to visually locate said bar code, said spotter beam being substantially parallel to one plane of said hand held bar code reader; and
using said spotter beam and said two dimensional image to determine said measured focal length and said measured range.

12. A method in accordance with claim 1 wherein said hand held bar code reader includes variable imaging optics, said method, further comprising:
providing a spotter beam to visually locate said bar code, said spotter beam being substantially parallel to one plane of said hand held bar code reader;
measuring the range to said bar code from said hand held bar code reader; and
measuring the focal length of said variable imaging optics using said spotter beam.

13. A method in accordance with claim 12, further comprising:
setting the focus of said variable imaging optics.

14. A method in accordance with claim 13, further comprising:
setting the focal length of said variable imaging optics of said hand held bar code reader to provide magnification of said bar code image at a predetermined level.

15. A method in accordance with claim 14, wherein said focal length setting to provide said predetermined level of said magnification of said bar code at a given distance from said bar code reader is a constant.

16. A method in accordance with claim 14, wherein said focal length setting to provide said predetermined level of said magnification of said bar code at a given distance from said bar code reader is determined from said two dimensional image containing the image of said bar code.

17. A method in accordance with claim 16, further comprising:
setting the focal length of said variable flash illumination optics.

18. A method in accordance with claim 1 wherein said hand held bar code reader includes variable imaging optics, said method further comprising:
measuring the focal length of said variable imaging optics.

19. A method in accordance with claim 18, further comprising:
measuring the range to said bar code from said hand held bar code reader.

20. A method in accordance with claim 19, further comprising:
providing a spotter beam to visually locate said bar code, said spotter beam being substantially parallel to one plane of said hand held bar code reader; and
using said spotter beam and said two dimensional image to determine said measured focal length and said measured range.

21. In a hand held bar code reader, having variable imaging optics, and flash illumination including variable flash illumination optics, a method of operation comprising:
aiming said hand held bar code reader at a bar code by hand;
providing a spotter beam to visually locate said bar code, said spotter beam being substantially parallel to one plane of said hand held bar code reader;
measuring the range to said bar code from said hand held bar code reader using said spotter beam;
measuring the focal length of said variable imaging optics using said spotter beam;
setting the focal length of said variable imaging optics to provide magnification of said bar code image substantially at a predetermined level;
setting the focal length of said variable flash illumination optics;
measuring the level of ambient light;
setting said flash of illumination energy level in accordance with said measured level of ambient light;
providing a focused flash of illumination, said focused flash of illumination substantially covering the field of view of said bar code reader;
capturing a two dimensional image, said two dimensional image containing the image of said bar code; and
scanning said two dimensional image in an omnidirectional manner to read out information contained in said bar code.

22. In a hand held bar code reader having a two dimensional image capture means with a field of view defining an imaged area, said imaged area containing a bar code, said bar code reader comprising:
means for providing a flash of illumination forming an illuminated area, wherein said illuminated area is substantially coincident with and substantially equal to said imaged area over a substantial portion of the operating range of said hand held bar code reader;
means for capturing a two dimensional image of said imaged area; and
means for processing said captured two dimensional image in an omnidirectional manner to read out information contained in said bar code.

23. An apparatus in accordance with claim 22, wherein said bar code in said imaged area is a two dimensional symbology.

24. An apparatus in accordance with claim 22, further comprising:
means for measuring the level of ambient light; and
means for setting said flash of illumination energy level in accordance with said measured level of ambient light.

25. An apparatus in accordance with claim 22, wherein said hand held bar code reader further comprises:
variable flash illumination optics;
means for setting the focal length of said variable flash illumination optics.

26. An apparatus in accordance with claim 22 wherein said hand held bar code reader further comprises:
   variable imaging optics;
   means for setting the focal length of said variable imaging optics of said hand held bar code reader to provide magnification of said bar code image at a predetermined level.

27. An apparatus in accordance with claim 26, further comprising:
   means for setting the focus of said variable imaging optics.

28. An apparatus in accordance with claim 26, wherein said means for setting said focal length provides said predetermined level of said magnification of said bar code at a given distance from said bar code reader at a constant.

29. An apparatus in accordance with claim 26, wherein said means for setting said focal length provides said predetermined level of said magnification of said bar code at a given distance from said bar code reader at a value determined from said two dimensional image containing the image of said bar code.

30. An apparatus in accordance with claim 27 wherein said hand held bar code reader further comprises:
   variable imaging optics; and
   measuring the focal length of said variable imaging optics.

31. An apparatus in accordance with claim 30, further comprising:
   means for measuring the range to said bar code from said hand held bar code reader.

32. An apparatus in accordance with claim 31, further comprising:
   a spotter beam for visually locating said bar code, said spotter beam being substantially parallel to one plane of said hand held bar code reader; and
   means responsive to said spotter beam and said two dimensional image to determine said measured focal length and said measured range.

33. An apparatus in accordance with claim 22 wherein said hand held bar code reader further comprises:
   variable imaging optics;
   a spotter beam for visually locating said bar code, said spotter beam being substantially parallel to one plane of said hand held bar code reader;
   means responsive to spotter beam for measuring the range to said bar code from said hand held bar code reader; and
   means responsive to said spotter beam for measuring the focal length of said variable imaging optics.

34. An apparatus method in accordance with claim 33, further comprising:
   means for setting the focus of said variable imaging optics.

35. An apparatus in accordance with claim 34, further comprising:
   means for setting the focal length of said variable imaging optics of said hand held bar code reader to provide magnification of said bar code image at a predetermined level.

36. An apparatus in accordance with claim 35, wherein said means for setting said focal length provides said predetermined level of said magnification of said bar code at a given distance from said bar code reader is a constant.

37. An apparatus in accordance with claim 35, wherein said means for setting said focal length provides said predetermined level of said magnification of said bar code at a given distance from said bar code reader at a value determined from said two dimensional image containing the image of said bar code.

38. An apparatus in accordance with claim 37, further comprising:
   means for setting the focal length of said variable flash illumination optics.

39. An apparatus in accordance with claim 22 wherein said hand held bar code reader further comprises:
   variable imaging optics; and
   means for measuring the focal length of said variable imaging optics.

40. An apparatus in accordance with claim 39, further comprising:
   means for measuring the range to said bar code from said hand held bar code reader.

41. An apparatus in accordance with claim 40, further comprising:
   a spotter beam for visually locating said bar code, said spotter beam being substantially parallel to one plane of said hand held bar code reader; and
   means responsive to said spotter beam and said two dimensional image for determining said measured focal length and said measured range.

42. A hand held bar code reader comprising:
   variable imaging optics;
   means for flash illumination, including variable flash illumination optics;
   aiming said hand held bar code reader at a bar code by hand;
   a spotter beam for visually locating said bar code, said spotter beam being substantially parallel to one plane of said hand held bar code reader;
   means for measuring the range to said bar code from said hand held bar code reader using said spotter beam;
   means for measuring the focal length of said variable imaging optics using said spotter beam;
   means for setting the focus of said variable imaging optics;
   means for setting the focal length of said variable imaging optics to provide magnification of said bar code image substantially at a predetermined level;
   means for setting the focal length of said variable flash illumination optics;
   means for measuring the level of ambient light;
   means for setting said flash of illumination energy level in accordance with said measured level of ambient light;
   means for providing a focused flash of illumination, said focused flash of illumination substantially covering the field of view of said bar code reader;
   means for capturing a two dimensional image, said two dimensional image containing the image of said bar code; and
   means for scanning said two dimensional image in an omnidirectional manner to read out information contained in said bar code.

43. In a bar code reader including a two dimensional imaging means with variable optics for capturing a two dimensional image containing the image of said bar code, a method for determining range and focal length comprising:

providing a spotter beam to visually locate said bar code, said spotter beam being substantially parallel to a first plane of said bar code reader, and said spotter beam being at a substantially fixed angle to a second plane of said bar code reader;

measuring the first displacement of said spotter beam in said two dimensional image along an axis perpendicular to said first plane;

measuring the second displacement of said spotter beam in said two dimensional image along an axis perpendicular to said second plane;

determining the focal length of said variable optics from said second displacement; and determining the range between said bar code and said bar code reader from said first and second displacements.

44. A bar code reader comprising:

a two dimensional imaging means with variable optics for capturing a two dimensional image containing the image of said bar code;

a spotter beam for visually locating said bar code, said spotter beam being substantially parallel to a first plane of said bar code reader, and said spotter beam being at a substantially fixed angle to a second plane of said bar code reader;

means for measuring the first displacement of said spotter beam in said two dimensional image along an axis perpendicular to said first plane;

means for measuring the second displacement of said spotter beam in said two dimensional image along an axis perpendicular to said second plane;

means responsive to said second displacement for determining the focal length of said variable optics; and means responsive to said first and second displacements for determining the range between said bar code and said bar code reader.

45. A method in accordance with claim 1 further comprising measuring the range to said bar code from said bar code reader.

46. A method in accordance with claim 45, wherein said hand held bar code reader further includes variable imaging optics, said method further comprises:

setting the focal length of said variable imaging optics to provide magnification of said bar code image substantially at a predetermined level; and setting the focus of said variable imaging optics.

47. An apparatus in accordance with claim 1 further comprising means for measuring the range to said bar code from said bar code reader.

48. An apparatus in accordance with claim 47, wherein said hand held bar code reader further includes variable imaging optics, said apparatus further comprises:

means for setting the focal length of said variable imaging optics to provide magnification of said bar code image substantially at a predetermined level; and means for setting the focus of said variable imaging optics.

* * * * *